United States Patent [19]
Memoli

[11] 3,958,521
[45] May 25, 1976

[54] DEEP SEA TANK AND SEAPORT SYSTEM

[76] Inventor: Steven J. Memoli, Box 720 N. Vosseller Ave., Martinsville, N.J. 08836

[22] Filed: May 30, 1975

[21] Appl. No.: 582,091

[52] U.S. Cl. .................................. 114/.5 T; 61/1 F
[51] Int. Cl.² .................. B63B 25/08; B63B 35/32
[58] Field of Search ............. 114/.5 F, .5 T; 61/1 R, 61/1 F, 5; 210/242

[56] References Cited
UNITED STATES PATENTS

| | | | |
|---|---|---|---|
| 3,327,667 | 6/1967 | Manning | 114/.5 T |
| 3,708,982 | 1/1973 | Blockwick | 114/.5 T |

*Primary Examiner*—Trygve M. Blix
*Assistant Examiner*—Stuart M. Goldstein
*Attorney, Agent, or Firm*—Frederick L. Bergert

[57] ABSTRACT

A deep sea tank and seaport system is disclosed. The system includes a plurality of deep sea tanks which provide a containment barrier surrounding one or more towers which function as a docking facility for oil tankers. The deep sea tanks are connected to a cable surrounding the tower, with an opening at either end of the tank arrangement to permit access by the oil tankers to the tower. The tower employs features which ensure a stabilized platform, while allowing easy access to the tankers. The tower is equipped with living and operational spaces for the crew, and a pipeline is provided to allow transfer of oil to the shore. The present system is advantageously employed around oil drilling rigs and in other environments in which it is desired to contain oil spills or other pollutants floating on the water.

9 Claims, 8 Drawing Figures

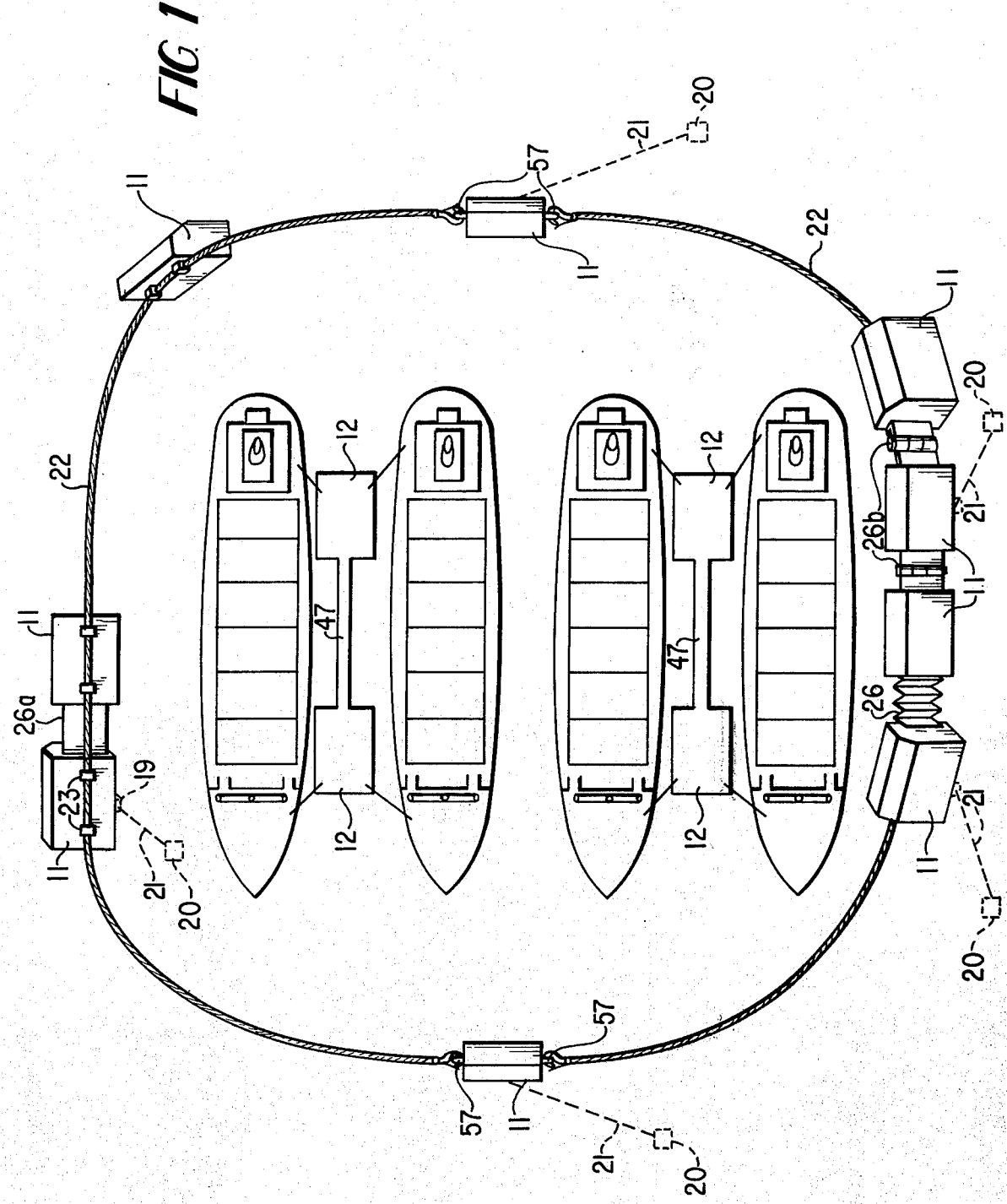

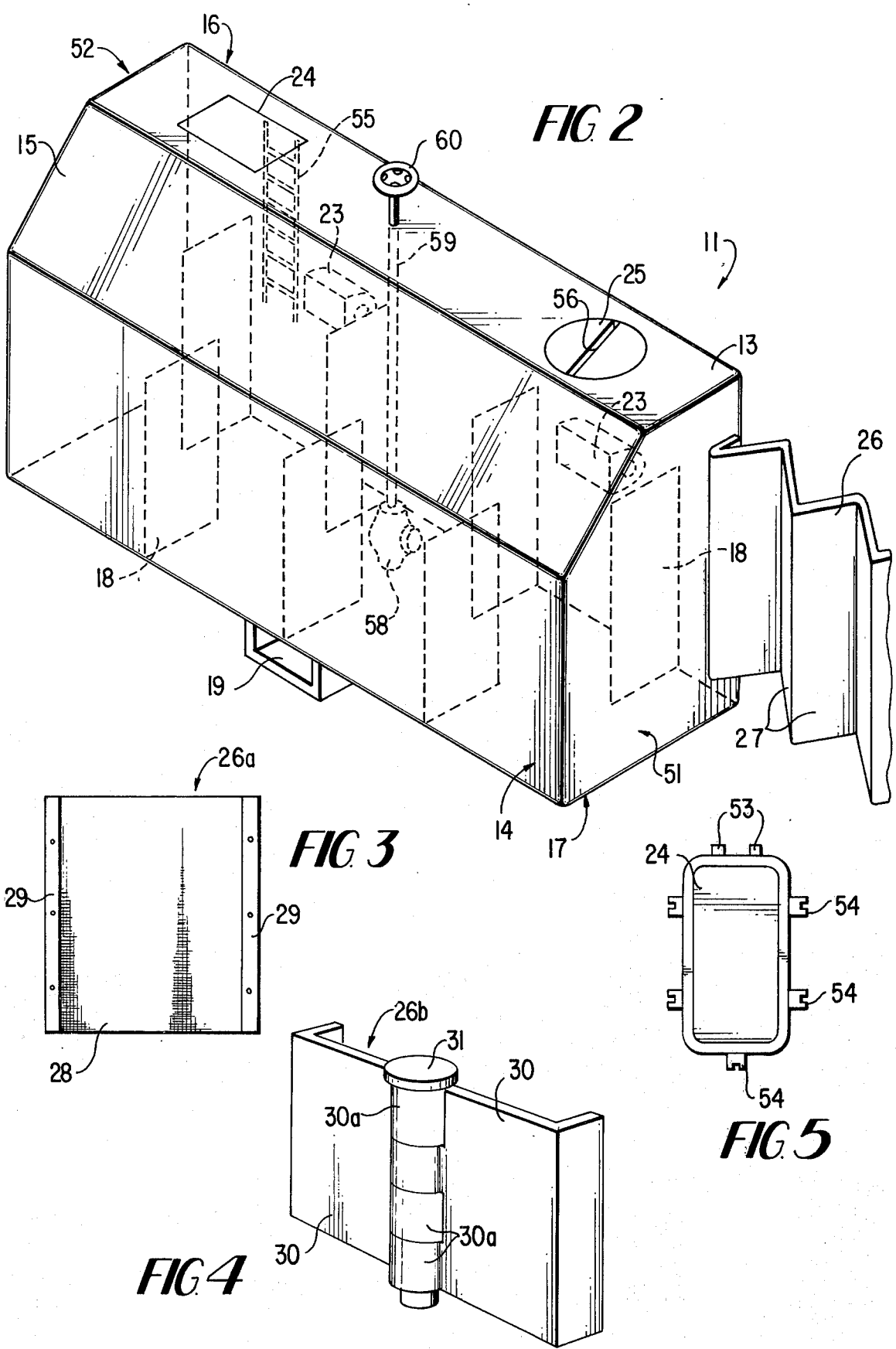

DEEP SEA TANK AND SEAPORT SYSTEM

BACKGROUND AND SUMMARY OF THE INVENTION

The present invention is concerned with an arrangement of deep sea tanks and a seaport for containing oil spills or other material floating on the water. More particularly, the present invention is concerned with a generally circular containment barrier constructed of deep sea tanks which are anchored to the bottom of the sea, with one or more towers located in the center thereof to serve oil tankers.

Previous apparatus for confining oil slicks and other pollutants floating on the surface of the ocean or other body of water have included various types of barriers, booms and tanks for confining the oil, with various configurations being employed in order to allow the particular containment members to adapt themselves to the environment in which they are positioned. Such previous containment barriers have been accompanied by various disadvantages, including poor flotation, lack of accommodation to various wave conditions in the ocean and incompatibility with transfer apparatus for transferring oil which has been confined to a collection point.

By the present invention, there is provided a configuration of deep sea tanks and a seaport arrangement which is advantageously constructed in order to contain oil spills from such sources as broken oil lines, leaking pumps or accidents on tankers or ships. The apparatus of the present invention includes a plurality of interconnected buoyant, deep sea tanks with a skirt member interposed between adjacent tanks to define the boundary of a containment area for containing material such as oil floating on the water. Means is provided for anchoring certain of the tanks to the seabed. The deep sea tanks surround one or more towers which function as a docking facility for oil tankers and other ships. The tower employs features which ensure a stabilized platform, while also providing easy access to ships coming alongside. The tower is equipped with a pipeline for connection with the oil line of a docked ship to allow transfer of oil to the shore. Also provided on the tower are compartments which function as living and operational spaces, as well as a helicopter port.

BRIEF DESCRIPTION OF THE DRAWINGS

The advantages and features of the deep sea tank and seaport arrangement of the present invention will be more clearly understood from the following description of the preferred embodiments, taken in conjunction with the accompanying drawings wherein:

FIG. 1 is a schematic plan view of the deep sea tank and seaport construction of the present invention;

FIG. 2 is a perspective view of a deep sea tank with attached skirt member employed in the present invention;

FIG. 3 is an elevational view of a second embodiment of a skirt member for connecting adjacent deep sea tanks of the present invention;

FIG. 4 shows a third embodiment of a skirt member for connecting the deep sea tanks;

FIG. 5 shows an elevational view of a hatch cover which may be employed with the deep sea tank of the present invention;

DESCRIPTION OF THE PREFERRED EMBODIMENTS

Figure 6:
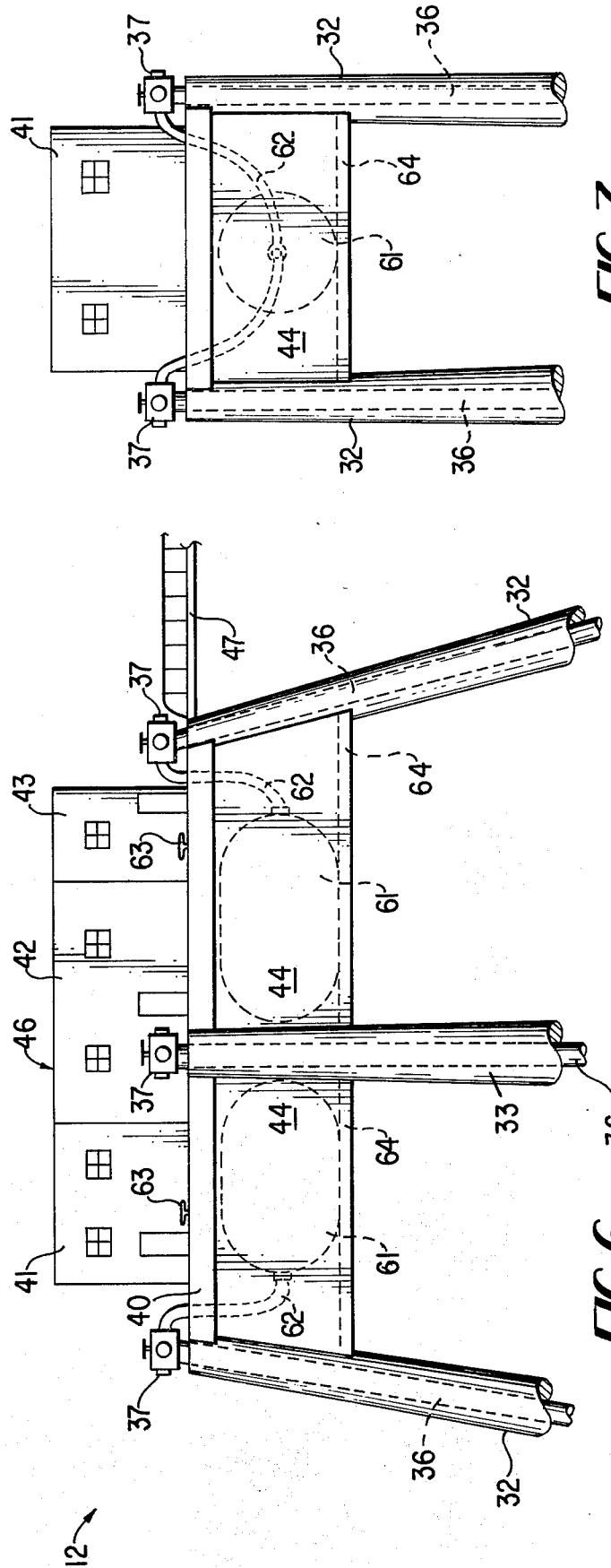
FIG. 6 is a partial elevational view of a tower employed in the present invention.
Figure 7:
FIG. 7 is a partial side view of the tower shown in FIG. 6.

In the embodiments of the present invention as shown in FIGS. 1 through 8, there is provided a deep sea tank and seaport arrangement which includes a plurality of interconnected deep sea tanks 11 which float on the surface of a body of water such as the ocean and which encircle or otherwise surround one or more stationary towers 12. In the schematic view of FIG. 1, only a representative number of tanks 11 are shown, but it should be understood that the tanks 11 will normally extend around the entire periphery of the containment area in order to provide an uninterrupted barrier.

As shown in detail in FIG. 2, each of the buoyant tanks 11 is formed in a generally rectangular box-shaped hollow configuration with its longest dimension being the horizontally disposed length of the tank 11 which extends parallel to the perimeter or boundary formed by the tanks 11 as they are linked to confine an oil spill. The deep sea tanks 11 can be made from steel, fiberglass or a similar material. A hatch 24 or screw cap 25 allows access for sea water to be removed from the tanks 11 to permit adjustment of the buoyancy of the tanks 11. The tanks 11 will, of course, ride lower in the water as they are increasingly filled with water, and the stability characteristics may thus be varied. Water may be removed from the tanks 11 by means such as tugs which come alongside the tanks 11 and insert pumping apparatus into the tanks 11 through the hatch 24 or screw cap 25. While both a hatch 24 and cap 25 are shown in the embodiment of FIG. 2, only one such opening into a tank 11 is needed, and the hatch 24 is often employed with tanks 11 of a larger size, while the screw cap 25 is employed with smaller tanks 11. A ladder 55 is attached to the deck 13 adjacent the hatch 24 or screw cap 25, as shown in FIG. 2, to provide access to the interior bottom of the tank 11 for purposes such as cleaning and inspection.

In order to allow water to be added to the tanks 11, a conventional sea cock valve 58 is located generally in the center of the bottom 17 of each tank 11. A valve stem 59 extends upwardly from the valve 58 through to the exterior of the top deck 13 of the tank 11 and is there connected to a suitable wheel 60 for use in manually opening and closing the valve 58 in a conventional manner. Sealing material (not shown) is employed as necessary to insure a watertight fit of the tank 11 with the valve 58 and stem 59 arrangement.

The upper horizontal 13 and outer vertical 14 surfaces of each tank 11 are connected by an inclined planar surface 15 which slants upwardly from its intersection with surface 14 at an angle to the horizontal of approximately 45 degrees. Due to the intersection of surface 14 with surface 15, the height of the outer vertical surface 14 of the tank 11 is about two-thirds the height of the inner vertical surface 16, and the width of upper horizontal surface or deck 13 is about one-half the width of lower horizontal surface 17. These dimensions for the tanks 11 have been found to result in improved stability and buoyancy characteristics of the tanks 11, particularly under conditions of strong winds and high waves which are frequently encountered in a deep sea environment.

A system of vertical baffle plates 18 is arranged inside each of the tanks 11 in order to maintain the tanks 11 in an upright position and reduce their tendency to tilt from one side to the other when partially filled with water. The baffle plates 18 are evenly spaced along the longitudinal axis of the tank 11 and are positioned so as to break up the surge of water flowing from one end to the other end of the tank 11 which occurs when any significant amount of water is present in the tanks. The plates 18 may be constructed in sheet form of any suitable durable material. The plates 18 are attached by welding or bolt means, for example, at one side and the bottom end to the inner wall of the respective vertical surfaces 14, 16 and lower surface 17. The baffle plates 18 are attached alternately to surfaces 14 and 16, as shown in FIG. 2. Each of the tanks 11 is closed at each end by vertical end walls 51, 52.

The width of the plates 18 is generally about one-half the width of the tank 11 while the plate 18 height is from about one-half to two-thirds the height of the tank 11. The plates 18 attached to inner vertical surface 16 preferably are of somewhat greater height than the plates 18 attached to the outer vertical surface 14, since the volume of water surging on the interior of a tank 11 adjacent vertical surface 16 will often be greater due to the increased height of surface 16 relative to surface 14. Thus, in one embodiment of the present invention which has been utilized with good results, the height of the plates 18 attached to vertical surface 14 is about one-half the height of the tank 11, while the height of the plates 18 attached to vertical surface 16 is about two-thirds the height of the tank 11.

A cable hook-up bracket 19 is provided on the bottom of each tank 11 to allow the tanks 11 to be anchored to the bottom of the sea using means such as a conventional anchor 20 and chain 21, for example. Generally, the main tanks 11 at each end of the barrier, to be described hereinafter, are provided with such anchoring means and alternating tanks 11 around the barrier are also provided with the anchoring means. Each tank 11 is linked to the adjacent tanks 11 by a cable 22 which extends in a generally circular path around the towers 12, passing through a pair of receiving brackets 23 attached to the inner vertical surface 16 of each tank 11.

It has been found that the use of a pair of brackets 23 located at approximately the mid-point of the height of the tanks 11, together with the particular configuration of the tanks 11 including the planar surface 15 on the outer upper portion of each tank 11, provides particularly good stability features and seaworthiness which result in an excellent capability of the linked tanks 11 to function as an oil confinement barrier. Such capability is also assisted by the baffle plates 18 located on the interior of the tanks 11.

In order to prevent oil from passing between the tanks 11, a skirt member 26 is attached between adjacent tanks 11 around the perimeter of the containment barrier. As shown in FIG. 2, the skirt member is in the form of an accordian-shaped construction 26 having elements 27 of equal dimensions. The skirt member 26 is attached along its length on each side to the tank 11 on either side thereof so as to close off the space between tanks 11. The accordian-shaped configuration 26 may be constructed of fiberglass or plastic material of sturdy construction and is easily attached to tanks 11 constructed of fiberglass or plastic material by the use of, for example, a plastic weld. Other conventional attachment means are employed for other materials. The material for the skirt member 26 is preferably somewhat pliable, in order to allow the skirt member 26 to adjust to variations in the distance between tanks 11.

A skirt member 26a as shown in FIG. 3 may be employed in place of member 26, this member 26a including a close wire mesh screen 28, of stainless steel or similar material, to which is attached a vertical metal bar 29 on each side thereof. The bar 29 is attached by means such as screws or welding to the tank 11 on either side.

The embodiment of the skirt member 26b as shown in FIG. 4 includes a pair of L-shaped flanges 30 of general angle iron configuration with inner ring-shaped hinge portions 30a which mesh in a conventional manner and are connected by a hinge pin 31. The two panels which form the L-shaped flanges 30 are joined at an angle of about 90°. The outer portions of each flange 30 are attached to the tanks 11 on each side by means such as screws or welding.

In the schematic view of FIG. 1, various embodiments of the skirt member are shown in the containment barrier. It is within the scope of the invention to employ only one type of skirt member throughout the barrier, or otherwise to vary the arrangement of the skirt members shown in FIG. 1.

In FIG. 5, there is shown an elevational view of the hatch cover 24 which may be employed, the hatch 24 having conventional hinges 53 at one end which are attached to the deck 13 of the tank 11. A series of toggle clamps 54 are provided on the remaining three sides for latching engagement with corresponding bolts (not shown) on the deck 13 to allow the hatch cover 24 to be secured in a water-tight manner. The screw cap 25 as shown in FIG. 2 is an alternative means of providing access to the interior of the tank 11 for the purpose of removing water. The cap 25 is shaped in a conventional manner with a threaded periphery which mates with corresponding threads in the deck 13. A slot 56 is provided for engagement with a suitable tool which can be inserted in the slot 56 and can allow pressure to be brought to bear on the cap 25 for screwing and unscrewing the cap 25 in a conventional manner.

An entrance to the area occupied by the towers 12 is provided at each end of the containment barrier by a main tank 11 having a cable attachment ring 57 mounted on either side thereof, as shown in FIG. 1. The cable 22 which links the tanks 11 is in two sections, one section for each of the two sides of the barrier, and each of the two sections of cable 22 is connected at each end to the attachment ring 57 of the respective main tank 11 by suitable connecting means. Such connecting means is preferably easily disconnected from the ring 57 to allow quick and easy opening of the barrier for passage of ships and may include means such as a swivel link and senhouse slip attached to the end of the cable 22 for releasable connection to the ring 57.

As shown in FIGS. 1, 6, 7 and 8, the seaport includes one or more double A-frame towers 12, with the two A-frame members in each tower unit 12 being joined by a catwalk 47. The towers 12 are constructed of steel I-beam and steel plate materials and with a top deck 40 having a generally rectangular shape. The two legs 32 at each end are disposed outwardly at an angle to the left and right of the tower 12 shown in FIG. 6, the angle being the same at each end. The center leg 33 on each side, however, extends vertically so as not to hinder ships which are coming alongside. Also, the legs 32 on the ends of the tower 12 extend outwardly so as to lie in a common vertical plane with the respective center leg 33 in order not to hinder ships coming alonside. Cleats 63 are located on the deck 40 to allow securing of ships' lines to the towers 12. An angle of about 20° for the legs 32 may be advantageously employed.

The legs 32, 33 are pipe-like in construction and taper from a smaller diameter at the top to a larger diameter at the bottom for purposes of providing strength. The catwalk 47 between the two A-frames of each tower is of conventional construction and provides ease of access between frames.

Figure 8:
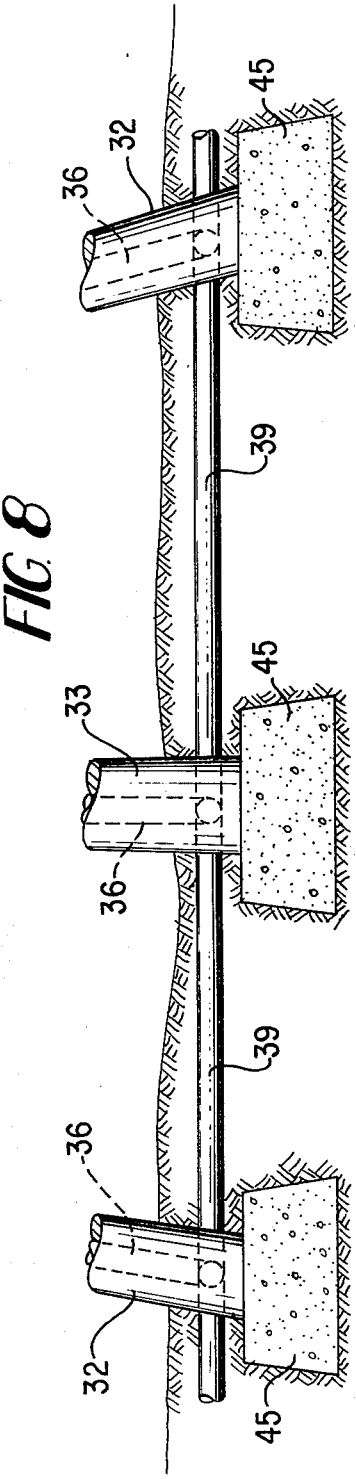
FIG. 8 is a partial elevational view of the lower portion of the tower shown in FIG. 6.

Within each leg 32, 33 is located a pipe 36 which is an oil line having a conventional valve and pump assembly 37 at the upper end, including means for connection to the oil lines (not shown) of ships. At the lower ends, the pipes 36 are connected to oil lines 39 which run under the sea bed to the shore, as shown in FIG. 8. Additional pumps (not shown) should be provided as necessary along the sea bed route for use in transferring oil to the land-based destination. The legs 32, 33 are mounted in concrete supports 45 in the sea bed.

On the top deck 40, there is provided a radio shack 41, and a combined recreation-dining room 42, as well as sleeping quarters 43. Such living and operating spaces may be simply constructed by the use of sheet steel and other conventional materials. Other compartments 44 are also provided for storage and for settling tanks 61 mounted on lower decks 64 to receive oil picked up from the surface of the water. A pipeline 62 connects the tanks 61 with the respective valve and pump arrangement 37 to allow oil to be pumped into or out of the tanks 61. When pumping oil out of a tank 61, such oil may be pumped either into a tanker whose oil line is connected to the valve and pump system 37, or the oil may be pumped into the oil pipes 36 for transfer to the shore.

The roof of the tower structure 12 may be advantageously employed as a helicopter port, through use of reinforced construction.

In the event of an oil spill, the oil is contained within the barrier created by the deep sea tanks 11 and thus the oil is prevented from reaching the shore line. The deep sea tanks 11 can also be employed with oil rig drillings at sea to prevent oil spills from reaching the shore.

Thus the present system is provided with many oil spill containment precautions, including a containment barrier in the form of a series of deep sea tanks 11 which are especially constructed to contain oil spills from such sources as oil tankers and broken oil lines. An oil spill would be contained within the link of tanks 11, then by means of a skimmer or other collecting device (not shown), a deep sea tug would be able to pick up the oil and transmit it to settling tanks 61 located within the compartments 44 on the towers 12, from which the oil could be reclaimed. Depending upon the sea conditions, the tanks 11 which serve as a protection from oil spills may be raised or lowered by pumping water in or out, so as to modify the buoyancy and oil-retention characteristics of the barrier.

Oil tankers or ships would normally be towed by tugs into the port through the barrier openings in the vicinity of the main tanks 11 at each end of the barrier. The tankers should be equipped with both bow and stern anchors so that the tankers could be stationary and yet need not totally depend upon the ships' securing lines to maintain position. In addition to towing the tankers in and out, tugs may be used to open and close the links of tanks 11 surrounding the towers 12.

As an example of specifications which may be employed in the present apparatus, ships having a length of about 1,000 feet and with approximately 90-foot draft are advantageously employed with the present configuration. The deep sea tanks 11 could be, for example, approximately 40 feet in length, having a width of about 15 feet and with an overall height of about 20 feet. The barrier created by the tanks 11 may encircle an area of approximately 1½ miles in diameter. The towers 12 would be located in the center of this barrier and a pipeline provided to stretch from the towers 12 to the shore, advantageously a distance of 10 miles or less, depending upon the depth of the water and the draft of the particular tanker.

It is thought that the invention and many of its attendant advantages will be understood from the foregoing description, and it will be apparent that various changes may be made in the form, construction and arrangement of the parts without departing from the spirit and scope of the invention or sacrificing its material advantages, the forms hereinbefore described being merely the preferred embodiments thereof.

It is claimed:

1. Apparatus for containing materials floating on the surface of a body of water, comprising: a plurality of tanks connected by a cable in a generally closed pattern, each of said tanks being shaped as a generally rectangular box-shaped hollow member with its longest dimension being the horizontally disposed length of the tank which extends parallel to the barrier formed by the tanks and having a bottom and top surface connected by an inner and outer vertical surface and a pair of vertical end surfaces, the top surface and outer vertical surface of each tank being connected by an inclined planar surface which slants upwardly at an angle of approximately 45°, a plurality of vertical baffle plates attached within each tank to the bottom and alternately to the inner and outer vertical surfaces of the tank, the width of the baffle plates being about one-half the width of the tank, the height of the baffle plates attached to the inner vertical surface being greater than the height of the plates attached to the outer vertical surface, means for introducing water into said tanks, a port in the top surface of each tank for removal of water therefrom, a skirt member attached to the end surfaces of each of the adjacent tanks and being of sufficient height to prevent said floating materials from passing between the tanks, and means for anchoring alternate tanks to the sea bed underlying said body of water.

2. The apparatus of claim 1, wherein at least one of said skirt members comprises an accordian-shaped member having elements of equal dimensions.

3. The apparatus of claim 1, wherein at least one of said skirt members comprises a wire mesh screen having a vertical metal bar on each side thereof.

4. The apparatus of claim 1, wherein at least one of said skirt members comprises a pair of L-shaped flanges with inner hinge portions connected by a hinge pin.

5. The apparatus of claim 1, wherein the height of the baffle plates attached to the outer vertical surface is about one-half the height of the tank, while the height of the baffle plates attached to the inner vertical surface is about two-thirds the height of the tank.

6. The apparatus of claim 1, wherein the height of the outer vertical surface is about two-thirds the height of the inner vertical surface and wherein the width of the top surface is about one-half the width of the bottom surface.

7. The apparatus of claim 1, wherein the connecting cable is attached to the inner vertical surface of each tank by a pair of brackets located at approximately the mid-point of the height of the tank.

8. The apparatus of claim 1, wherein an entrance to the center portion of the circular pattern is provided on opposite sides of said pattern by a pair of tanks, one of said pair of tanks being located on each of said opposite sides, each of said pair of tanks having a cable attachment ring mounted on each of the vertical end surfaces thereof, and wherein the connecting cable is provided in two sections, each of the two cable sections being releasably connected at each end to one of said cable attachment rings.

9. The apparatus of claim 1, further including at least one double A-frame tower located in the center portion of said circular pattern, said tower including a pair of A-frame members joined by a catwalk, each of said A-frame members having a horizontal top deck of a generally rectangular shape with a pair of legs at each end which extend outwardly from said deck at an angle relative to the vertical and a center vertical leg on each of the longer sides of the deck, the legs attached to the ends of the deck being in a common plane with the respective center leg to avoid hindering ships coming alongside, each of the end legs and center legs being pipe-like in construction and tapering from a smaller diameter at the top to larger diameter at the bottom, all of said legs being mounted in support members in the sea bed, an oil line located within at least one of said legs and extending the length thereof, said oil line terminating at its upper end in a valve and pump means for pumping oil upwardly or downwardly through said oil line, said valve and pump means including means for connecting the oil line to the oil line of a ship docked alongside said tower, said oil line located in said leg being connected at its lower end to an oil line which runs under the sea bed to a land-based destination.

* * * * *